United States Patent
Bergqvist

(10) Patent No.: US 12,365,287 B2
(45) Date of Patent: Jul. 22, 2025

(54) FOLDABLE FRONT STEP AND VEHICLE

(71) Applicant: Volvo Truck Corporation, Gothenburg (SE)

(72) Inventor: Hans Bergqvist, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 381 days.

(21) Appl. No.: 17/960,498

(22) Filed: Oct. 5, 2022

(65) Prior Publication Data

US 2023/0135535 A1 May 4, 2023

(30) Foreign Application Priority Data

Nov. 3, 2021 (EP) .................................... 21206261

(51) Int. Cl.
*B60R 3/02* (2006.01)
(52) U.S. Cl.
CPC ..................................... *B60R 3/02* (2013.01)
(58) Field of Classification Search
CPC .. B60R 3/02; B60R 9/06; B60R 19/52; B60R 3/00; B60R 3/007; B60R 5/02
USPC ........................................................ 280/163
See application file for complete search history.

(56) References Cited

U.S. PATENT DOCUMENTS

| | | | | |
|---|---|---|---|---|
| 4,274,648 A * | 6/1981 | Robins | ...................... | B60R 3/02 280/166 |
| 4,785,910 A * | 11/1988 | Tonkovich | .............. | B60R 3/007 182/61 |
| 4,911,264 A * | 3/1990 | McCafferty | .............. | B25H 5/00 182/62 |
| 5,000,503 A * | 3/1991 | Bernatek | ................. | B60R 13/01 296/57.1 |
| 5,139,295 A * | 8/1992 | Escobedo | ................. | B60R 3/00 280/163 |
| 6,447,032 B1 * | 9/2002 | Howell, Sr. | ............. | B60R 19/52 224/489 |
| 6,540,278 B2 * | 4/2003 | Presley | .............. | B62D 33/0273 296/26.11 |
| 9,403,487 B1 * | 8/2016 | Diehl | ...................... | B62D 25/12 |
| 9,481,308 B2 * | 11/2016 | Dringenberg | ............. | B60R 3/02 |
| 9,739,078 B2 * | 8/2017 | Diehl | ........................ | E05C 3/16 |
| 10,279,764 B1 * | 5/2019 | Wymore | ................... | B60R 3/00 |
| 10,562,456 B2 * | 2/2020 | Lynch | ....................... | B60R 3/02 |
| 2002/0074818 A1 * | 6/2002 | Presley | .............. | B62D 33/0273 296/57.1 |

(Continued)

FOREIGN PATENT DOCUMENTS

DE 102016011627 A1 4/2017
WO 2021059156 A1 4/2021

OTHER PUBLICATIONS

Extended European Search Report for European Patent Application No. 21206261.6, mailed May 9, 2022, 6 pages.

*Primary Examiner* — James A Shriver, II
*Assistant Examiner* — Hilary L Johns
(74) *Attorney, Agent, or Firm* — Withrow & Terranova, PLLC

(57) ABSTRACT

A foldable front step for a vehicle which is adapted to be mounted at a front end of the vehicle, typically a front end of a vehicle cab, wherein the front step is adapted to be folded between an open position and a closed position when being mounted to the vehicle and wherein the front step has a length extension corresponding to a transverse extension of the vehicle when the front step is mounted thereto.

17 Claims, 3 Drawing Sheets

(56) References Cited

U.S. PATENT DOCUMENTS

| | | | |
|---|---|---|---|
| 2005/0252720 A1* | 11/2005 | Chant | E06C 5/02 |
| | | | 182/127 |
| 2013/0154229 A1 | 6/2013 | Kim | |
| 2016/0243992 A1* | 8/2016 | Diehl | B62D 25/12 |
| 2016/0305171 A1* | 10/2016 | Diehl | E05B 83/24 |
| 2020/0001793 A1* | 1/2020 | Lynch | B60R 19/48 |

* cited by examiner

FOLDABLE FRONT STEP AND VEHICLE

RELATED APPLICATIONS

The present application claims priority to European Patent Application No. 21206261.6, filed on Nov. 3, 2021, and entitled "FOLDABLE FRONT STEP AND VEHICLE," which is incorporated herein by reference in its entirety.

TECHNICAL FIELD

The invention relates to a foldable front step for a vehicle which is adapted to be mounted at a front end of the vehicle. The invention also relates to a vehicle.

The invention can be applied in heavy-duty vehicles, such as trucks, buses and construction equipment. Although the invention will be described with respect to a heavy-duty truck, the invention is not restricted to this particular vehicle, but may also be used in other vehicles such as other trucks, buses and working machines.

BACKGROUND

For large vehicles, such as heavy-duty trucks, it is known to utilize a front end portion thereof as a foldable front step for a user. More particularly, a vehicle cabin may at its front end comprise a foldable front step which can be folded to an open position so that a user can stand on the foldable front step. Thereby, the user, e.g. a driver, can by use of the foldable front step reach certain parts of the vehicle cabin which otherwise would not be reachable by the user. For example, when standing on the foldable front step, the user may be able to reach the windshield to e.g. clean the windshield or to replace the windshield wipers.

The foldable front step typically comprises an outer cover member which forms an outer cover of the vehicle when the foldable front step is in the closed position. The outer cover member is preferably a design surface of the vehicle, i.e. it may be painted and/or formed to contribute to the external visual appearance of the vehicle.

Even though it is known to utilize a foldable front step as mentioned in the above, there is still a strive to develop further improved foldable front steps which alleviates at least one of the drawbacks of the prior art.

SUMMARY

In view of the above, an object of the invention is to provide an improved foldable front step which alleviates at least one drawback of the prior art. In particular, an object of the invention is to provide a foldable front step which achieves at least one of the following advantages: 1) it enables for a larger and more usable standing surface for the user, 2) it reduces the risk of corrosion, 3) it results in a more robust and rigid configuration, 4) it results in a cost-effective configuration, and 5) it results in a low-weight configuration.

The object is at least partly achieved by a foldable front step.

Thus, there is provided a foldable front step for a vehicle which is adapted to be mounted at a front end of the vehicle, typically a front end of a vehicle cab. The front step is adapted to be folded between an open position and a closed position when being mounted to the vehicle. Furthermore, the front step has a length extension corresponding to a transverse extension of the vehicle when the front step is mounted thereto.

The front step comprises:
a back panel member comprising a standing surface on a first side thereof on which a user can stand when the front step is in the open position,
a plurality of beam members, wherein each beam member is extending in the length extension and is mechanically connected to the back panel member, wherein the back panel member and the plurality of beam members together form a load carrying structure for the user,
a first hinge receiving section and a second hinge receiving section for receiving a respective first and second hinge member, wherein the first and second hinge receiving sections are offset from each other, as seen in the length extension,
an attachment arrangement adapted to attach, preferably releasably attach, at least one outer cover member on an outside of the front step, as seen when the front step is in the closed position.

Furthermore, the back panel member is configured so that the standing surface extends in the length extension between the first and second hinge receiving sections and outside of each one of the first and second hinge receiving sections, each beam member is mechanically connected to the back panel member at a second opposite side of the back panel member with respect to the first side, and at least one of the beam members extends in the length extension between the first and second hinge receiving sections and outside of each one of the first and second hinge receiving sections.

By the provision of a foldable front step as disclosed herein, an improved foldable front step is achieved in which a larger and more usable standing surface is accomplished. More particularly, by allowing the standing surface to extend beyond the hinge receiving sections as mentioned herein, and by also allowing at least one of the beam members to also extend beyond the hinge receiving sections as mentioned herein, the user can stand at any position between outer end portions of the foldable front step without damaging the foldable front step. As such, the configuration leads to a robust and rigid configuration in which the user can stand at any position between the outer end portions. In addition, by configuring the foldable front step by positioning the beam members at the second opposite side of the back panel member, the standing surface can be made smoother, implying a further improved standing surface. Still further, by positioning the hinge receiving sections as mentioned herein, and e.g. not at the outer end portions, the risk of unwanted deflections when a user stands on the standing surface can be mitigated. It has also been realized that it may not be suitable to position hinge receiving sections at the outer end portions due to vehicle design restrictions.

Accordingly, in view of the above, an improved foldable front step is achieved.

Optionally, the back panel member may extend in the length extension between a first and a second outer end portion of the front step so that the standing surface is formed as a continuous standing surface for the user between the first and second outer end portions. By a continuous standing surface is meant a surface along the length extension where the user can stand at any position between the outer end portions, i.e. so that there are no interruptions along the length extension inhibiting a user to stand thereon. Thereby, a more flexible standing surface will be achieved, allowing the user to stand at any position along the length extension.

Preferably, the back panel member may be made in one single piece. This implies a more robust and rigid back panel member, reducing the risk of unwanted deflections. It further implies a more cost-effective configuration, requiring fewer parts for accomplishing the foldable front step.

Optionally, at least one of the beam members may extend in the length extension from the first outer end portion to the second outer end portion of the front step. Thereby, the rigidity and robustness of the foldable front step may be further improved.

Optionally, the back panel member may comprise at least one recess extending in the length extension for receiving one or more of the plurality of beam members. This implies an improved connection interface between the at least one beam member and the back panel member. This also implies a more rigid and robust configuration where the at least one beam member may be more rigidly attached to the back panel member.

Optionally, the back panel member may be configured so that air can pass through the front step when the front step is in the closed position, such as the back panel member comprising a grid pattern with air vents. For example, the vehicle may comprise a power unit which requires cooling during use. Therefore, by allowing air to pass through the front step when the front step is in the closed position, the power unit may be cooled by use of the air.

Optionally, at least one of the first and second hinge receiving sections may be configured so that a connecting portion of a hinge member, when being connected to the load carrying structure at the first or second hinge receiving section, is located below the standing surface, as seen when the foldable front step is in the open position. Thereby, the connecting portion of the hinge member will not interfere with the standing surface, implying a larger standing surface.

Optionally, at least one of the first and second hinge receiving sections may be configured so that at least one of the beam members is resting on top of a connecting portion of a hinge member when the connecting portion is connected to the load carrying structure at the first or second hinge receiving section, as seen when the foldable front step is in the open position. Thereby, for example, loads as a consequence of the user standing on the front step will be transferred from the back panel member to the connecting portion of the hinge member via the at least one beam member. This implies a more robust and rigid configuration, reducing e.g. the risk of unwanted deflections. It further implies less risk of fatigue stress on the back panel member.

Optionally, the foldable front step may further comprise a first and a second hinge member, wherein a connecting portion of the first hinge member is connected to the load carrying structure at the first hinge receiving section and a connecting portion of the second hinge member is connected to the load carrying structure at the second hinge receiving section.

Optionally, the foldable front step may further comprise at least one outer cover member being attached, preferably releasably attached, to the attachment arrangement, wherein the at least one outer cover member is configured to form an outer cover of the vehicle when the foldable front step is in the closed position.

Optionally, the back panel member and the at least one outer cover member may be configured so that the plurality of beam members are concealed when the foldable front step is in the closed position and in the open position. By configuring the back panel member and the outer cover member so that the plurality of beam members are concealed, the risk of corrosion can be significantly reduced. In particular, it has been realized that a foldable front step at the front end of a vehicle cabin will be exposed to water, air and debris during driving, and therefore it is of particular importance to reduce the risk of corrosion. As such, by concealing the plurality of beam members, which typically are made of metal, the risk of corrosion can be reduced.

Furthermore, by also concealing the beam members when the front step is in the open position, the corrosion risk can be even further reduced.

Optionally, the at least one outer cover member may be configured so that it has a lower rigidity compared to the back panel member. This implies reduced weight.

Optionally, the back panel member may be made of a polymer, such as a polyamide and/or a fibre-reinforced polymer.

Optionally, the plurality of beam members may be made of a metallic material, such as steel or aluminium. The beam members are preferably hollow members, as seen in a cross-sectional view. The cross-section of the beam members may be square formed, rectangular formed, round, such as elliptically formed. Alternatively, the beam members may have an I-shaped, H-shaped or U-shaped cross-sectional profile, or any other cross-sectional profile which increases the bending stiffness of the beam member.

The object is also at least partly achieved by a vehicle comprising a foldable front step according to any one of the embodiments of the foldable front step as disclosed herein. The vehicle may be a heavy-duty vehicle such as, e.g., a truck, a working machine, or a bus.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1A:
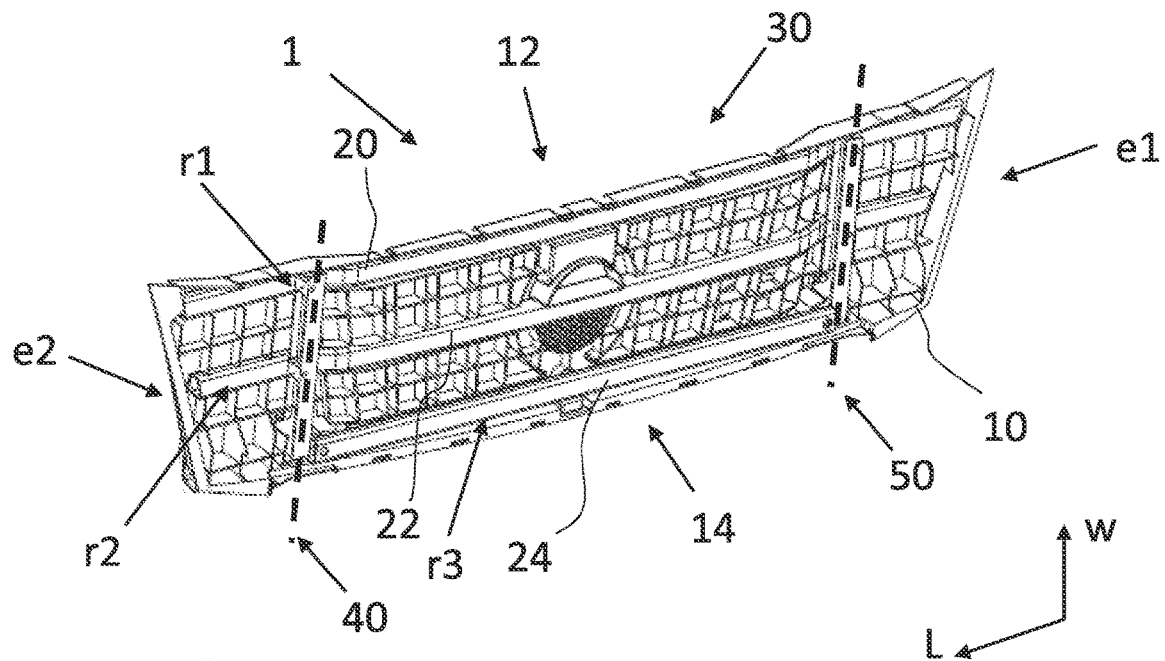
FIG. 1a is a perspective view of a foldable front step according to an example embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

FIG. 1a, FIG. 1b, FIG. 2a, and FIG. 2b depict two respective example embodiments of a foldable front step 1 according to the present invention.

Figure 1B:
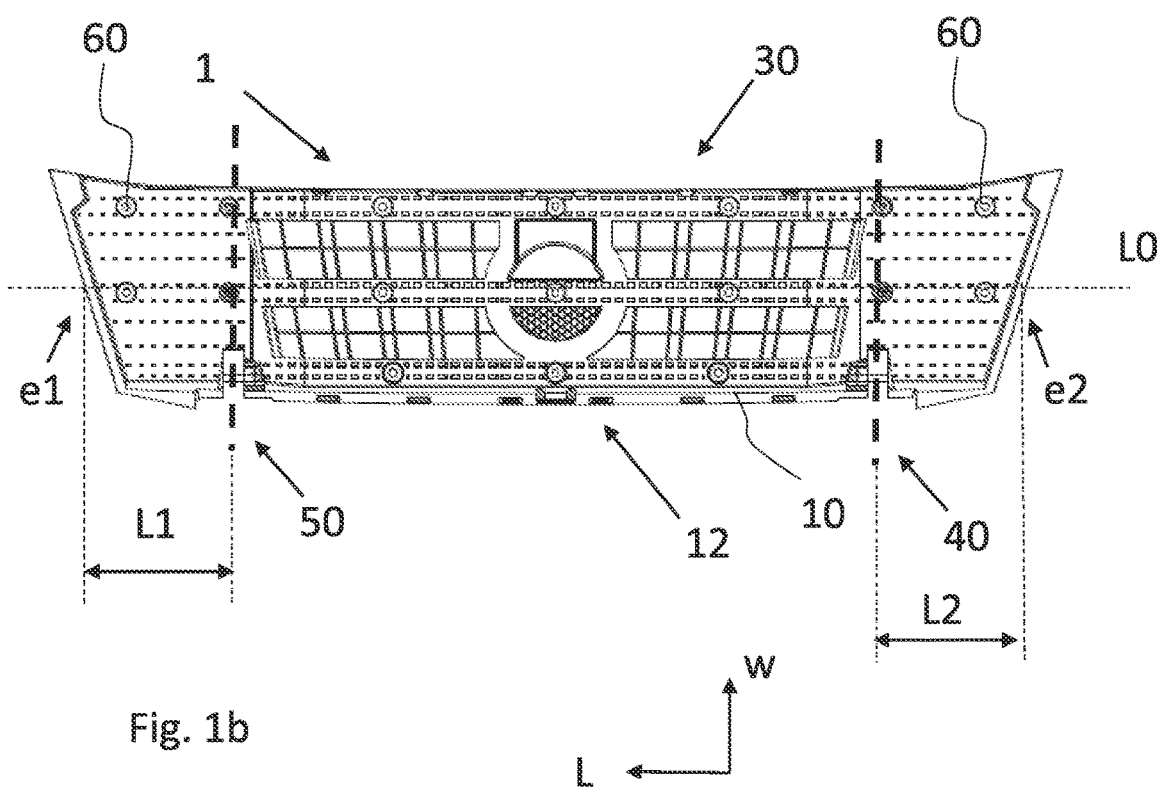
FIG. 1b is another view of the foldable front step as shown in FIG. 1a, FIG. 2a is a perspective view a foldable front step according to another example embodiment of the present invention.
Figure 4:
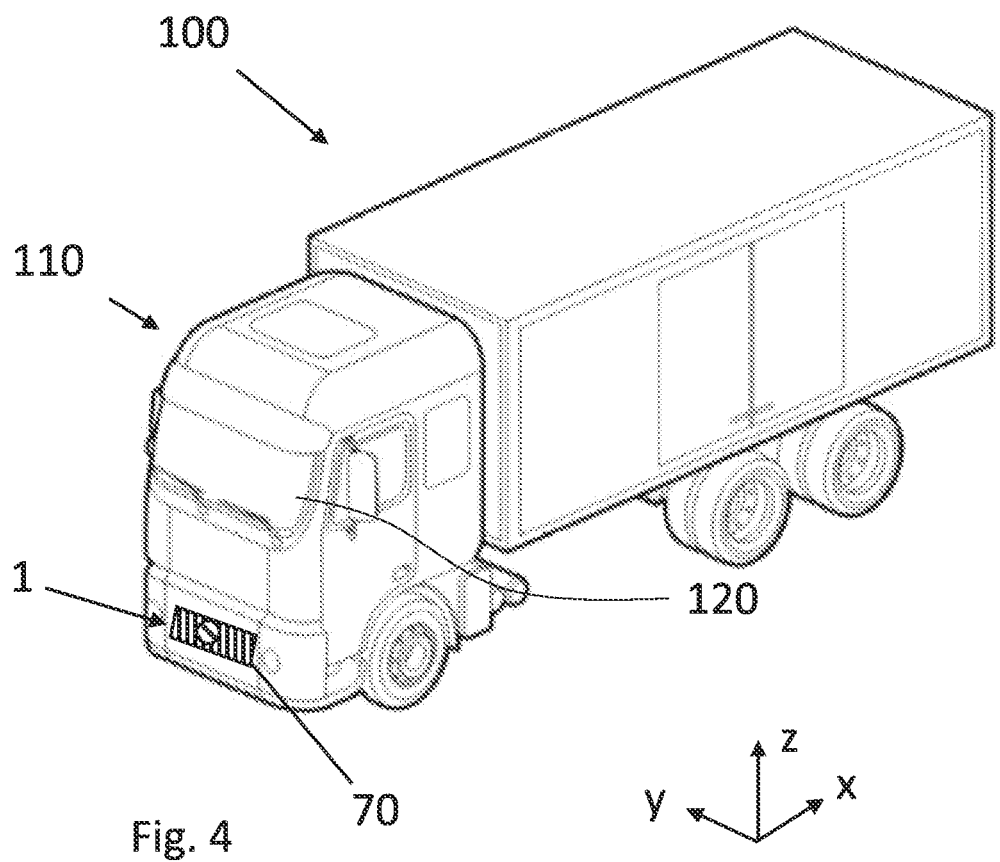
FIG. 4 is a perspective view of a vehicle according to an example embodiment of the present invention.

Referring to e.g. FIG. 1a and FIG. 1b, there is provided a foldable front step 1 for a vehicle 100 which is adapted to be mounted at a front end of the vehicle 100, typically a front end of a vehicle cab 110. An example of a vehicle 100 and a vehicle cab 110 is shown in FIG. 4. As shown, the foldable front step 1 is typically positioned at the front end of the vehicle cab 110 and also at a position below a windshield 120. The front step 1 is adapted to be folded between an open position and a closed position when being mounted to the vehicle 100. As such, a user can stand on the foldable front step 1 when it is provided in the open position and thereby reach the windshield 120 or any other part of the vehicle cabin 110 close to the windshield. When in the closed position, the foldable front step 1 forms an outer surface portion of the vehicle cab 110. As further shown, the foldable front step 1 is preferably provided on a substantially vertical surface of the vehicle 100, herein a surface of the vehicle cabin 120. The surface extends in a vertical direction z, as seen when the vehicle 100 is located on a flat horizontally extending surface.

The front step 1 has a length extension L corresponding to a transverse extension y of the vehicle 100 when the front step 1 is mounted thereto. The transverse extension y of the vehicle 100 extends in a transverse direction y and is perpendicular to the vertical direction z, corresponding to a height direction, and also perpendicular to a longitudinal direction x of the vehicle 100.

The front step 1 comprises:
a back panel member 10 comprising a standing surface 12 on a first side 12 thereof on which a user can stand when the front step 1 is in the open position,
a plurality of beam members 20, 22, 24, wherein each beam member 20, 22, 24 is extending in the length extension L and is mechanically connected to the back panel member 10. The back panel member 10 and the plurality of beam members 20, 22, 24 together form a load carrying structure 30 for the user.

The front step 1 further comprises:
a first hinge receiving section 40 and a second hinge receiving section 50 for receiving a respective first and second hinge member 42, 52, wherein the first and second hinge receiving sections 40, 50 are offset from each other, as seen in the length extension L.

The hinge receiving sections 40, 50 as shown extends in a width extension w of the front step 1 and are indicated by respective dash-dotted lines. The width extension w substantially extends in the height direction z when the front step 1 is mounted to the vehicle 100 and provided in the closed position. Furthermore, the width extension w substantially extends in the longitudinal direction x when the front step 1 is mounted to the vehicle 100 and provided in the open position.

The foldable front step 1 further comprises an attachment arrangement 60 adapted to attach, preferably releasably attach, at least one outer cover member 70 on an outside of the front step 1, as seen when the front step is in the closed position. In the shown examples, the attachment arrangement 60 comprises a plurality of attachment positions distributed over the front step 1.

Furthermore, the back panel member 10 is configured so that the standing surface 12 extends in the length extension L between the first and second hinge receiving sections 40, 50 and outside of each one of the first and second hinge receiving sections 40, 50. Still further, each beam member 20, 22, 24 is mechanically connected to the back panel member 10 at a second opposite side 14 of the back panel member 10 with respect to the first side 12 and, at least one of the beam members 20, 22, 24 extends in the length extension L between the first and second hinge receiving sections 40, 50 and outside of each one of the first and second hinge receiving sections 40, 50.

In the closed position, the standing surface 12 will face the vehicle 100 and be concealed from the outside, and the opposite side 14 will face away from the vehicle 100.

In the embodiment shown in FIG. 1a and FIG. 1b, two beam members 20, 22 out of a total of three beam members 20, 22, 24 extends in the length extension L between the first and second hinge receiving sections 40, 50 and outside of each one of the first and second hinge receiving sections 40, 50, whereas the third beam member 24 extends between the first and second hinge receiving sections 40, 50 only. In the shown embodiment, the third beam member 24 is the beam member which is located closest to a pivot axis A (see FIG. 3) about which the foldable front step 1 is foldable.

The pivot axis A about which the foldable front step 1 is foldable may as shown extend in the length extension L and also in the y-direction when the front step 1 is mounted to the vehicle 100. Accordingly, the front step 1 is preferably adapted to be mounted to the vehicle 100 via the pivot axis A.

It shall be understood that in alternative embodiments the foldable front step 1 may have more beam members or fewer beam members. As shown, at least one of the beam members, in this case each one of the beam members 20 and 22, extends in the length extension L from a first outer end portion e1 to a second outer end portion e2 of the front step 1.

As shown in FIG. 1b, each hinge receiving section 40, 50 is positioned offset from the respective outer end portion e1, e2 by a respective distance L1, L2, as seen in the length extension L. For example, the distance L1 between the outer end portion e1 and the hinge receiving section 50, and/or the distance L2 between the outer end portion e2 and the hinge receiving section 40, may correspond to at least 10%, such as 10-25%, of a length of the front step 1 measured along a mid-longitudinal line L0 of the front step 1. The mid-longitudinal line L0 extends in the length extension L and is provided in the centre of the front step 1, as seen in the width extension w. Still further, by way of example, a distance between the first and second hinge receiving sections 40, 50 may be 0.4 to 1.5 meters.

As further shown in FIG. 1a and FIG. 1b, the back panel member 10 may extend in the length extension L between the first and the second outer end portion e1, e2 of the front step 1 so that the standing surface 12 is formed as a continuous standing surface for the user between the first and second outer end portions e1, e2. Accordingly, a standing surface 12 along the length extension L is formed where the user can stand at any position between the outer end portions e1, e2. In other words, there are no interruptions along the length extension L which inhibits the user to stand thereon. For example, there are no interruptions caused by hinge members, such as caused by hinge arms connected to the front step 1. Thereby, a more flexible standing surface 12 will be achieved, allowing the user to stand at any position along the length extension L between the outer end portions e1, e2.

As further shown, the back panel member 10 may be made in one single piece. In this embodiment the back panel member 10 is made in one single piece from a polymer based material.

The back panel member 10 may as shown comprise at least one recess r1, r2, r3 extending in the length extension L for receiving one or more of the plurality of beam members 20, 22, 24. The recess(es) r1, r2, r3 may be formed in a moulding manufacturing procedure of the back panel member 10, implying a cost-effective manufacturing procedure.

The plurality of beam members 20, 22, 24 may as shown be distributed with a specific offset between each other, as seen in the width extension w. For example, the plurality of beam members 20, 22, 24 may be provided at equidistant positions with respect to each other along the width extension w.

The back panel member 10 may as further shown be configured so that air can pass through the front step 1 when the front step 1 is in the closed position. In the embodiment shown in FIG. 1a, FIG. 1b, FIG. 2a, and FIG. 2b, the back panel member 10 comprises a grid pattern with air vents. This grid pattern is preferably also formed in the aforementioned moulding manufacturing procedure. The back panel member 10 may as further shown be formed as a framework structure, implying a robust, rigid and light-weight configuration.

The first and second hinge receiving sections 40, 50 may as shown be configured so that a connecting portion 421, 521 (see FIG. 2a and FIG. 2b) of a hinge member 42, 52, when being connected to the load carrying structure 30 at the first or second hinge receiving section 40, 50, is located below the standing surface 12, as seen when the foldable front step 1 is in the open position. This is shown in both the embodiment of FIG. 1a and FIGS. 1b and 1n the embodiment of FIGS. 2a-b. As further shown in the two embodiments, the first and second hinge receiving sections 40, 50 may be configured so that at least one of the beam members, in this case each one of 20 and 22, is resting on top of a connecting portion 421, 521 of a hinge member 42, 52 when the connecting portion 421, 521 is connected to the load carrying structure 30 at the first or second hinge receiving section 40, 50, as seen when the foldable front step 1 is in the open position.

Figure 2A:
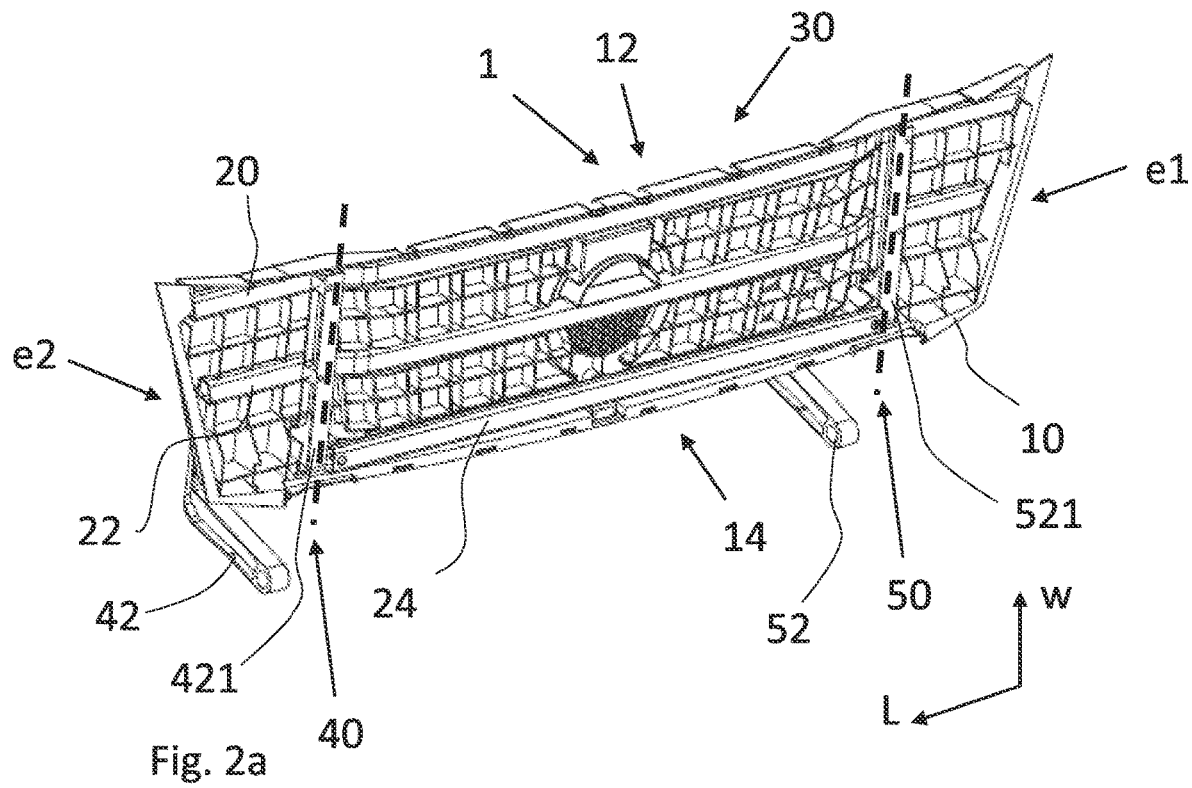
FIG. 2b is another view of the foldable front step as shown in FIG. 2a, FIG. 3 is a side view of a foldable front step according to an example embodiment of the present invention.
Figure 2B:
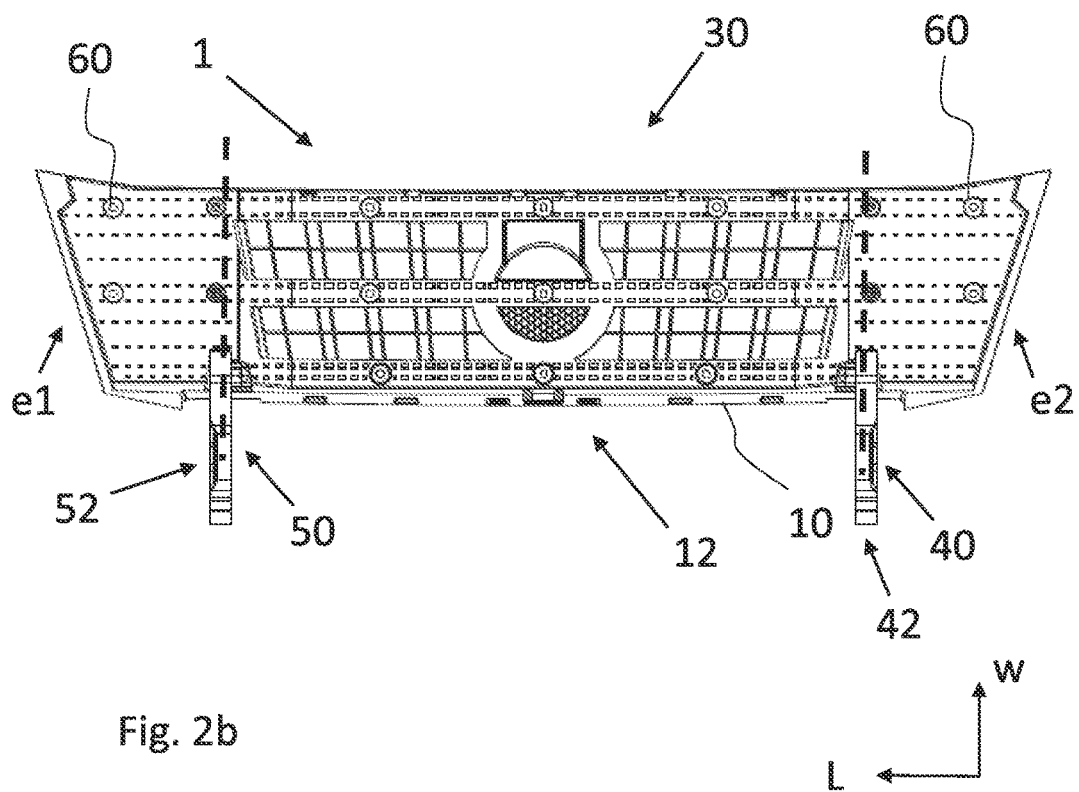
Figure 3:
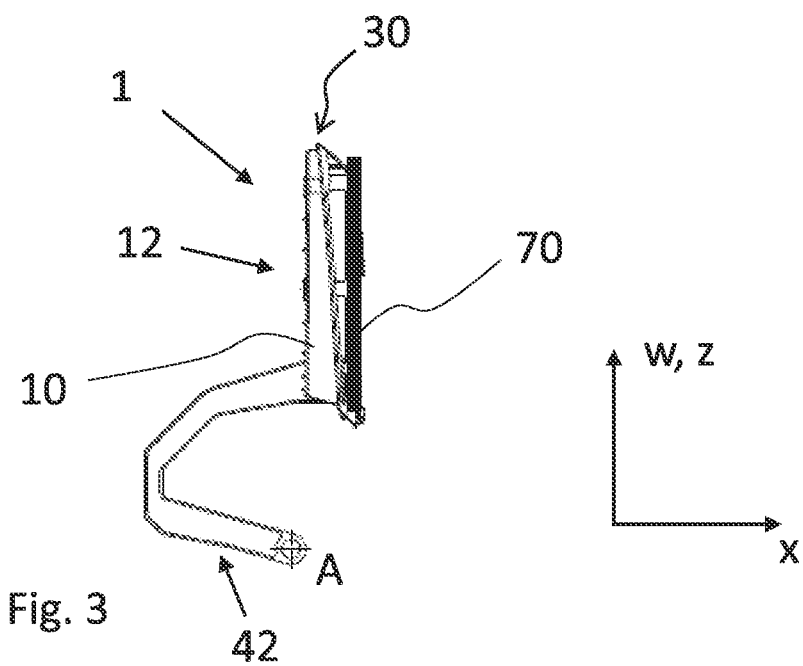

The embodiment in FIG. 2a and FIG. 2b differs from the embodiment in FIG. 1a and FIG. 1b in that it also comprises the hinge members 42, 52. Accordingly, the foldable front step 1 may further comprise a first and a second hinge member 42, 52, wherein a connecting portion 421 of the first hinge member 42 is connected to the load carrying structure 30 at the first hinge receiving section 40 and a connecting portion 521 of the second hinge member 52 is connected to the load carrying structure 30 at the second hinge receiving section 50. The foldable front step 1 of the second embodiment is also shown in FIG. 3, which depicts the front step 1 in a side view, as seen when the front step 1 is mounted to the vehicle 100. The first and a second hinge members 42, 52 are preferably concealed from the outside when the foldable front step 1 is in the closed position.

As shown in FIG. 3, the foldable front step 1 may further comprise at least one outer cover member 70 which is attached, in this case releasably attached, to the attachment arrangement 60. In the shown embodiments, the outer cover member 70 is formed in one single piece. The at least one outer cover member 70 is configured to form an outer cover of the vehicle 100 when the foldable front step 1 is in the closed position. In the shown embodiments, the attachment arrangement 60 comprises a plurality of clips, in this case plastic clips, which are used to releasably attach the outer cover member 70 to the back panel member 10 and/or to the beam members 20, 22, 24. The beam members 20, 22, 24, which here are provided in the recesses r1, r2, r3, are preferably also attached to the back panel member 10 by use of e.g. screws, bolts, clips or any other suitable attachment means. Furthermore, by way of example, the outer cover member 70 may be attached to the attachment means by a snap-fit connection, implying a fast and efficient mounting procedure.

As can be further gleaned from e.g. FIG. 3, the back panel member 10 and the at least one outer cover member 70 may be configured so that the plurality of beam members 20, 22, 24 are concealed when the foldable front step 1 is in the closed position and in the open position. More particularly, the beam members 20, 22, 24 are covered both from an inside and an outside of the front step 1, thereby reducing the risk of corrosion to the beam members 20, 22, 24.

The outer cover member 70 may be configured so that it has a lower rigidity compared to the back panel member 10. In the shown embodiments, the outer cover member 70 is made of a polymer and is thinner compared to the load carrying structure 30.

The plurality of beam members 20, 22, 24 are in the shown embodiments made of a metallic material, such as steel or aluminium.

It is to be understood that the present invention is not limited to the embodiments described above and illustrated in the drawings; rather, the skilled person will recognize that many changes and modifications may be made within the scope of the appended claims.

The invention claimed is:

1. A foldable front step for a vehicle which is configured to be mounted at a front end of the vehicle, typically a front end of a vehicle cab, wherein the front step is configured to be folded between an open position and a closed position when being mounted to the vehicle and wherein the front step has a length extension corresponding to a transverse extension of the vehicle when the front step is mounted thereto, the front step comprising:
   a back panel member comprising a standing surface on a first side thereof on which a user can stand when the front step is in the open position,
   a plurality of beam members, wherein each beam member is extending in the length extension and is mechanically connected to the back panel member, wherein the back panel member and the plurality of beam members together form a load carrying structure for the user,
   a first hinge receiving section and a second hinge receiving section for receiving a respective first and a second hinge member, wherein the first and the second hinge receiving sections are offset from each other, as seen in the length extension, and
   an attachment arrangement configured to attach at least one outer cover member on an outside of the front step, as seen when the front step is in the closed position,
   wherein the back panel member is configured so that the standing surface extends in the length extension between the first and the second hinge receiving sections and outside of each one of the first and the second hinge receiving sections, each beam member is mechanically connected to the back panel member at a second opposite side of the back panel member with respect to the first side, and at least one of the beam members extends in the length extension between the first and the second hinge receiving sections and outside of each one of the first and the second hinge receiving sections.

2. The foldable front step of claim 1, wherein the back panel member extends in the length extension between a first and a second outer end portion of the front step so that the standing surface is formed as a continuous standing surface for the user between the first and the second outer end portions.

3. The foldable front step of claim 1, wherein the back panel member is made in one single piece.

4. The foldable front step of claim 1, wherein at least one of the beam members extends in the length extension from the first outer end portion to the second outer end portion of the front step.

5. The foldable front step of claim 1, wherein the back panel member comprises at least one recess extending in the length extension for receiving one or more of the plurality of beam members.

6. The foldable front step of claim 1, wherein the back panel member is configured so that air can pass through the front step when the front step is in the closed position, such as the back panel member comprising a grid pattern with air vents.

7. The foldable front step of claim 1, wherein at least one of the first and the second hinge receiving sections is configured so that a connecting portion of a hinge member, when being connected to the load carrying structure at the first or the second hinge receiving section, is located below the standing surface, as seen when the foldable front step is in the open position.

8. The foldable front step of claim 1, wherein at least one of the first and the second hinge receiving sections is configured so that at least one of the beam members is resting on top of a connecting portion of a hinge member when the connecting portion is connected to the load carrying structure at the first or the second hinge receiving section, as seen when the foldable front step is in the open position.

9. The foldable front step of claim 1, further comprising a first and a second hinge member, wherein a connecting portion of the first hinge member is connected to the load carrying structure at the first hinge receiving section and a connecting portion of the second hinge member is connected to the load carrying structure at the second hinge receiving section.

10. The foldable front step of claim 1, further comprising at least one outer cover member being attached to the attachment arrangement, wherein the at least one outer cover member is configured to form an outer cover of the vehicle when the foldable front step is in the closed position.

11. The foldable front step of claim 10, wherein the back panel member and the at least one outer cover member are configured so that the plurality of beam members are concealed when the foldable front step is in the closed position and in the open position.

12. The foldable front step of claim 10, wherein the at least one outer cover member is configured so that it has a lower rigidity compared to the back panel member.

13. The foldable front step of claim 1, wherein the back panel member is made of a polymer, such as a polyamide and/or a fibre-reinforced polymer.

14. The foldable front step of claim 1, wherein the plurality of beam members are made of a metallic material, such as steel or aluminium.

15. A vehicle comprising the foldable front step of claim 1.

16. The foldable front step of claim 1, wherein the attachment arrangement is configured to releasably attach the at least one outer cover member on the outside of the front step.

17. The foldable front step of claim 10, wherein the at least one outer cover member is releasably attached to the attachment arrangement.

* * * * *